US010910835B1

(12) United States Patent
Esfahani et al.

(10) Patent No.: US 10,910,835 B1
(45) Date of Patent: Feb. 2, 2021

(54) SYSTEMS AND METHODS FOR PROTECTING AGAINST FAULT CURRENTS

(71) Applicants: Mohammad Mahmoudian Esfahani, Miami, FL (US); Osama Mohammed, Miami, FL (US)

(72) Inventors: Mohammad Mahmoudian Esfahani, Miami, FL (US); Osama Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/729,932

(22) Filed: Dec. 30, 2019

(51) Int. Cl.
*H02J 3/00* (2006.01)
*H02H 7/26* (2006.01)

(52) U.S. Cl.
CPC ............. *H02J 3/001* (2020.01); *H02H 7/262* (2013.01)

(58) Field of Classification Search
CPC .... H02H 7/26–263; H02H 7/30; H02H 7/262; H02J 3/001–00125
See application file for complete search history.

(56) References Cited

U.S. PATENT DOCUMENTS

| | | | | |
|---|---|---|---|---|
| 2012/0265360 | A1* | 10/2012 | Smit ...................... | H02H 7/262 700/293 |
| 2014/0211345 | A1* | 7/2014 | Thompson ................ | B60L 3/04 361/42 |
| 2014/0293494 | A1* | 10/2014 | Allen ...................... | H02H 7/20 361/93.1 |
| 2015/0185748 | A1* | 7/2015 | Ishchenko ................ | G05F 1/66 700/293 |
| 2016/0190790 | A1* | 6/2016 | Oudalov .................. | H02H 3/08 361/66 |
| 2016/0320785 | A1* | 11/2016 | Kondabathini .......... | H02H 3/00 |
| 2017/0146577 | A1* | 5/2017 | Kasztenny ............. | G01R 23/02 |
| 2018/0241199 | A1* | 8/2018 | Morgan ............. | H02J 13/0062 |
| 2018/0316188 | A1* | 11/2018 | Ishchenko ................ | H02H 7/28 |

* cited by examiner

*Primary Examiner* — Jared Fureman
*Assistant Examiner* — Christopher J Clark
(74) *Attorney, Agent, or Firm* — Saliwanchik, Lloyd & Eisenschenk

(57) ABSTRACT

Adaptive protection methods and systems for protecting agains) extreme fault currents in a power system are provided. Communication capabilities and protocols defined in IEC 61850 can be used to provide smart cascading switching actions for removing the fault from the power system. A supervisory protection algorithm can be used, and the protection can be activated if the fault current is higher than a breaking capacity of the circuit breakers of the power system.

18 Claims, 15 Drawing Sheets

SYSTEMS AND METHODS FOR PROTECTING AGAINST FAULT CURRENTS

BACKGROUND

Power system protection is one of the most critical and inseparable parts of power system operation. An optimal protection scheme removes the fault current from the system in the shortest possible time with the minimum outage of power system equipment. Different protection functions can be deployed for each system as main and backup protections. For example, in a transmission system, the main protection is typically distance protection while in a distribution system the main protection is typically overcurrent protection. In addition to the protection scheme, short circuit (SHC) level plays a vital role in selecting the protection equipment such as circuit breakers (CBs).

Standard CBs exist with different breaking capacities for each voltage level of the system, and these are typically chosen based on the SHC level in the system. For instance, in 220 kilovolt (kV) systems, two standard breaking capacities exist in the market—40 kiloamp (kA) and 50 kA. For systems having a SHC level less than 40 kA in the worst fault condition, a CB with 40 kA as the breaking capacity (BC) would be selected while for higher SHC levels (that are still less than 50 kA), the CB with 50 kA as the BC would be used. When the SHC level goes beyond the standard limits for CBs (e.g., if the SHC level is more than 50 kA in a 220 kV system), the standard CBs can't break the fault current and this may cause the operation of backup protection with higher fault clearing time (FCT), leading to more equipment outages.

One of the main reasons that the level of SHCs is increasing is the generation expansion due to high electric energy demands in power systems. Consumption of electric energy has increased significantly, as the total electricity demand in the United States has increased from 0.35 billion kilowatt-hours per year (kWh/year) in 1949 to 4 billion kWh/year in 2017. Power systems have therefore expanded, with more generation capacities installed in the system. The trend of increasing power demand continues, with even higher demand expected in future years. More generation capacity means higher SHC levels in the systems. Hence, it is very important to limit the SHC level as much as possible and attempt to keep it below the BC of CBs in the system for reliable protection action against fault currents. Network reconfiguration or installation of different types of fault current limiters (FCLs), such as high impedance transformers, current limiting reactors, or superconductor FCLs, have been used in power systems to attempt to address this problem. All these methods have disadvantages, which usually includes adding one or more new devices to the system that are very expensive and require extensive maintenance.

BRIEF SUMMARY

Embodiments of the subject invention provide adaptive protection methods and systems for dealing with (and protecting against) extreme fault currents in a power system (e.g., where the fault current is higher than the breaking capacity of circuit breakers of the power system). System and methods of embodiments of the subject ivention eliminate the need to install expensive fault current limiters (FCLs), which would otherwise require costly maintenance. Communication capabilities and protocols defined in International Electrotechnical Commission (IEC) 61850 can be used to provide smart cascading switching actions for removing the fault from the power system. A supervisory protection algorithm can be used in addition to conventional distance protection in high voltage (HV) transmission power systems. The protection can be activated if the fault current is higher than a breaking capacity of the circuit breakers of the power system, and the order of required switching actions can be determined to isolate the faulty part of the power system (i.e., the part of the system having the fault current) based on its location. If the fault current is not higher than a breaking capacity of the circuit breakers, a conventional distance protection is responsible for clearing the fault. System and methods of embodiments of the subject ivention are simple to implement in power systems, and the provide econmical solutions that enhance power system stability margin by quickly removing extreme fault currents.

In an embodiment, a method for protecting a power system against a(n) (extreme) fault current (e.g., where a value of the current fault is higher than a breaking capacity of a circuit breaker in the power system) can comprise: analyzing (e.g., by an intelligent electronic device (IED) in operable communication with the power system) data of transmission lines of the power system; identifying (e.g., by the IED) the current fault in a first transmission line of the transmission lines of the power system; and sending (e.g., by the IED) cascading tripping, blocking, and reclosing signals to relays of the power system to remove the current fault from the power system. The sending of the cascading tripping, blocking, and reclosing signals can comprise IEC 61850 standard communication protocols. The power system can comprise no FCLs and can also be in operable communication with no FCLs. The sending of the cascading tripping, blocking, and reclosing signals can comprise: sending (e.g., by the IED) a first blocking signal to a first relay on the first transmission line; sending (e.g., by the IED) a first tripping signal to a second relay on the first transmission line; determining (e.g., by the IED) a tripping order including determination of a third relay of the power system that is to be tripped; sending (e.g., by the IED) a second tripping signal to the third relay; sending (e.g., by the IED) a third tripping signal to the first relay; and determining (e.g., by the IED) if the current fault is removed from the power system and, if so, sending a reclosing signal to the third relay. The sending of the cascading tripping, blocking, and reclosing signals can further comprise: prior to determining if the current fault is removed from the power system, sending (e.g., by the IED) a second blocking signal to a fourth relay that is opposite the third relay on a second transmission line of the power system. The method can further comprise after identifying of the current fault, calculating (e.g., by the IED) a surplus current, and the determining of the tripping order can comprise performing Algorithm 1 as disclosed herein. The tripping, blocking, and reclosing signals can be generic object oriented substation event (GOOSE) signals; the current fault can be removed from the power system very quickly (e.g., in an amount time less than or equal to 100, 150, 200, 250, 300, or 350 milliseconds). The power system can be a smart power system.

In another embodiment, a framework for protecting a power system against a fault current (e.g., where a value of the current fault is higher than a breaking capacity of a circuit breaker in the power system) can comprise: a network switch in operable communication with the power system; and an IED in operable communication with the network switch and the power system, the IED comprising a processor and a machine-readable medium having instructions stored thereon that, when executed by the processor, perform the following steps: analyze data of transmission lines of the power system; identify the current fault in a first transmission line of the transmission lines of the power system; and send cascading tripping, blocking, and reclosing signals to relays of the power system to remove the current fault from the power system. The sending of the cascading tripping, blocking, and reclosing signals can comprise using IEC 61850 standard communication protocols. The power system can comprise no FCLs and can also be in operable communication with no FCLs. The sending of the cascading tripping, blocking, and reclosing signals can comprise: sending a first blocking signal to a first relay on the first transmission line; sending a first tripping signal to a second relay on the first transmission line; determining a tripping order including determination of a third relay of the power system that is to be tripped; sending a second tripping signal to the third relay; sending a third tripping signal to the first relay; and determining if the current fault is removed from the power system and, if so, sending a reclosing signal to the third relay. The sending of the cascading tripping, blocking, and reclosing signals can further comprise: prior to determining if the current fault is removed from the power system, sending a second blocking signal to a fourth relay that is opposite the third relay on a second transmission line of the power system. The instructions when executed can further perform the following step: after identifying of the current fault, calculating a surplus current, and the determining of the tripping order can comprise performing Algorithm 1 as disclosed herein. The tripping, blocking, and reclosing signals can be GOOSE signals; the current fault can be removed from the power system very quickly (e.g., in an amount time less than or equal to 100, 150, 200, 250, 300, or 350 milliseconds). The power system can be a smart power system.

BRIEF DESCRIPTION OF DRAWINGS

In FIG. 10, there are three curves whose value fluctuates in a sinusoidal-type fashion in the 0.2 s to 0.3 s window; the fluctuating curve with the highest value at 0.21 s is for R5_T (R5 transient), the fluctuating curve with the middle value at 0.21 s is for R13_T (R13 transient), and the fluctuating curve with the lowest value at 0.21 s is for R6_T (R6 transient). There are three curves whose value is fairly flat in the 0.2 s to 0.3 s window; the flat curve with the highest value at 0.21 s is for R5, the fluctuating curve with the middle value at 0.21 s is for R13, and the fluctuating curve with the lowest value at 0.21 s is for R6.

DETAILED DESCRIPTION

Figure 1:
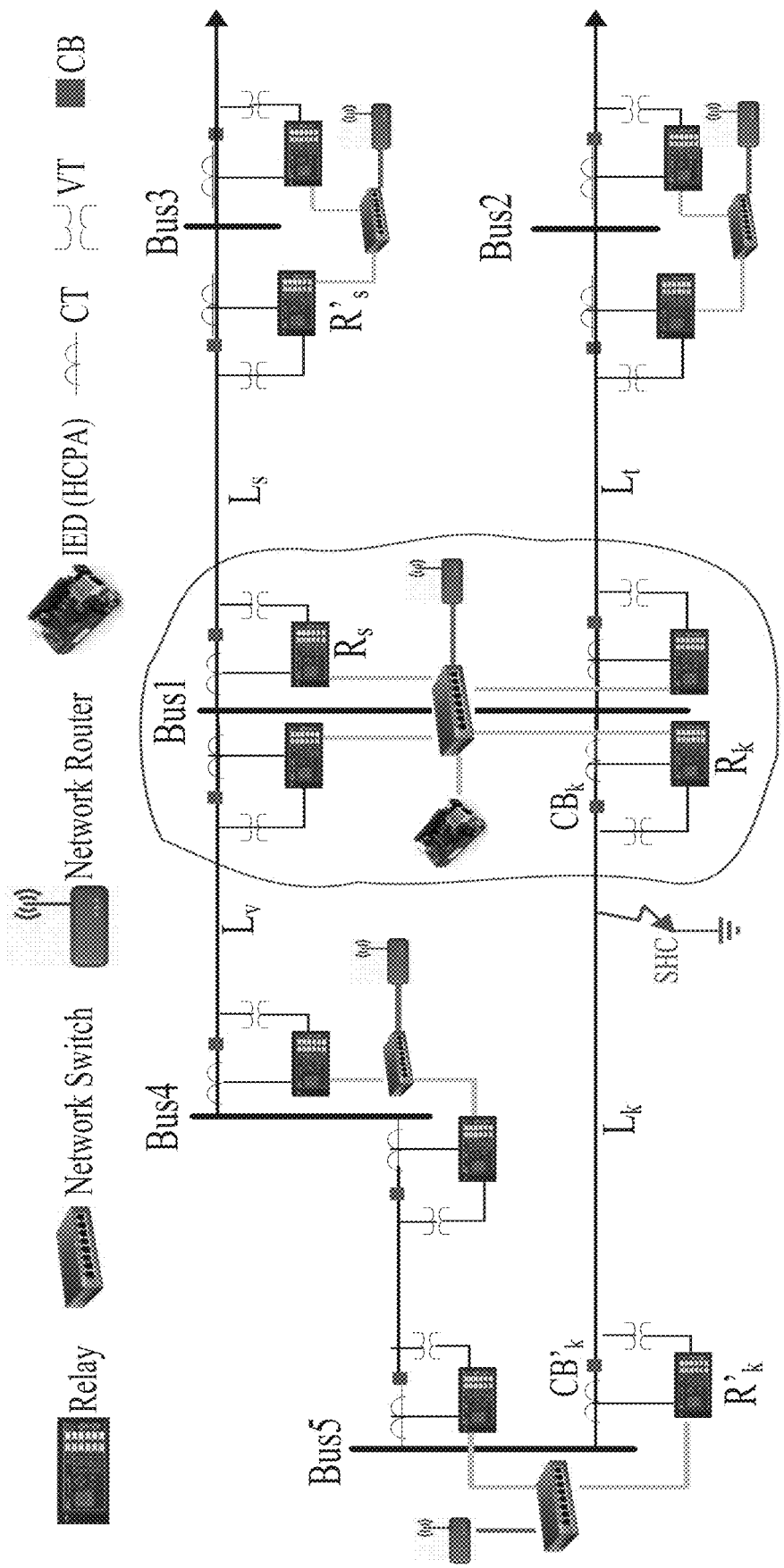
FIG. 1 shows a schematic view of a protection system architecture according to an embodiment of the subject invention. International Electrotechnical Commission (IEC) 61850 communication protocols can be used.

Embodiments of the subject invention provide adaptive protection methods and systems for dealing with (and protecting against) extreme fault currents in a power system, such as a smart power system (e.g., where the fault current is higher than the breaking capacity of circuit breakers of the power system). System and methods of embodiments of the subject ivention eliminate the need to install expensive fault current limiters (FCLs), which would otherwise require costly maintenance. Communication capabilities and protocols defined in International Electrotechnical Commission (IEC) 61850 can be used to provide smart cascading switching actions for removing the fault from the power system. A supervisory protection algorithm can be used in addition to conventional distance protection in high voltage (HV) transmission power systems. The protection can be activated if the fault current is higher than a breaking capacity of the circuit breakers of the power system, and the order of required switching actions can be determined to isolate the faulty part of the power system (i.e., the part of the system having the fault current) based on its location. If the fault current is not higher than a breaking capacity of the circuit breakers, a conventional distance protection can be responsible for clearing the fault. System and methods of embodiments of the subject ivention are simple to implement in power systems, and the provide econmical solutions that enhance power system stability margin by quickly removing extreme fault currents.

High current protection schemes (HCPSs) of embodiments of the subject invention can be implemented in modern substations where the IEC 61850 standard is used for protection purposes. It is expected that most substations in power systems will deploy the IEC 61850 standard in the near future.

By developing and implementing the IEC 61850 standard in advanced power system protection, intelligent protection schemes can be developed using defined protocols in IEC 61850. IEC 61850 is known as an international standard for communication of intelligent electronic devices (IEDs) in an electrical substation using defined protocols such as manufacturing message specification (MMS), sampled measured value (SMV), and generic object oriented substation event (GOOSE). As defined in this standard, these data models can be transmitted within a substation through a local area network (LAN) or for substation-to-substation (S2S) communication by a wide area network (WAN). These capabilities can be used in distribution systems and for microgrid protection, but they have not previously been used for designing an intelligent protection scheme to deal with extreme fault currents in HV transmission systems where distance protection is deployed as main and backup protections.

In embodiments, an intelligent protection method/scheme can be based on cascading switching actions within and between substations to manage very high fault currents (e.g., higher than the breaking capacity (BC) of circuit breakers (CBs) in the power system) in power systems (e.g., power transmission systems). The protection method can act as a supervisory protection scheme, which monitors the fault current in the power system and makes real-time decisions to deal with extreme short circuit (SHC) currents when a conventional protection scheme cannot clear the fault (or cannot clear the fault in an acceptable amount of time).

Figure 2:
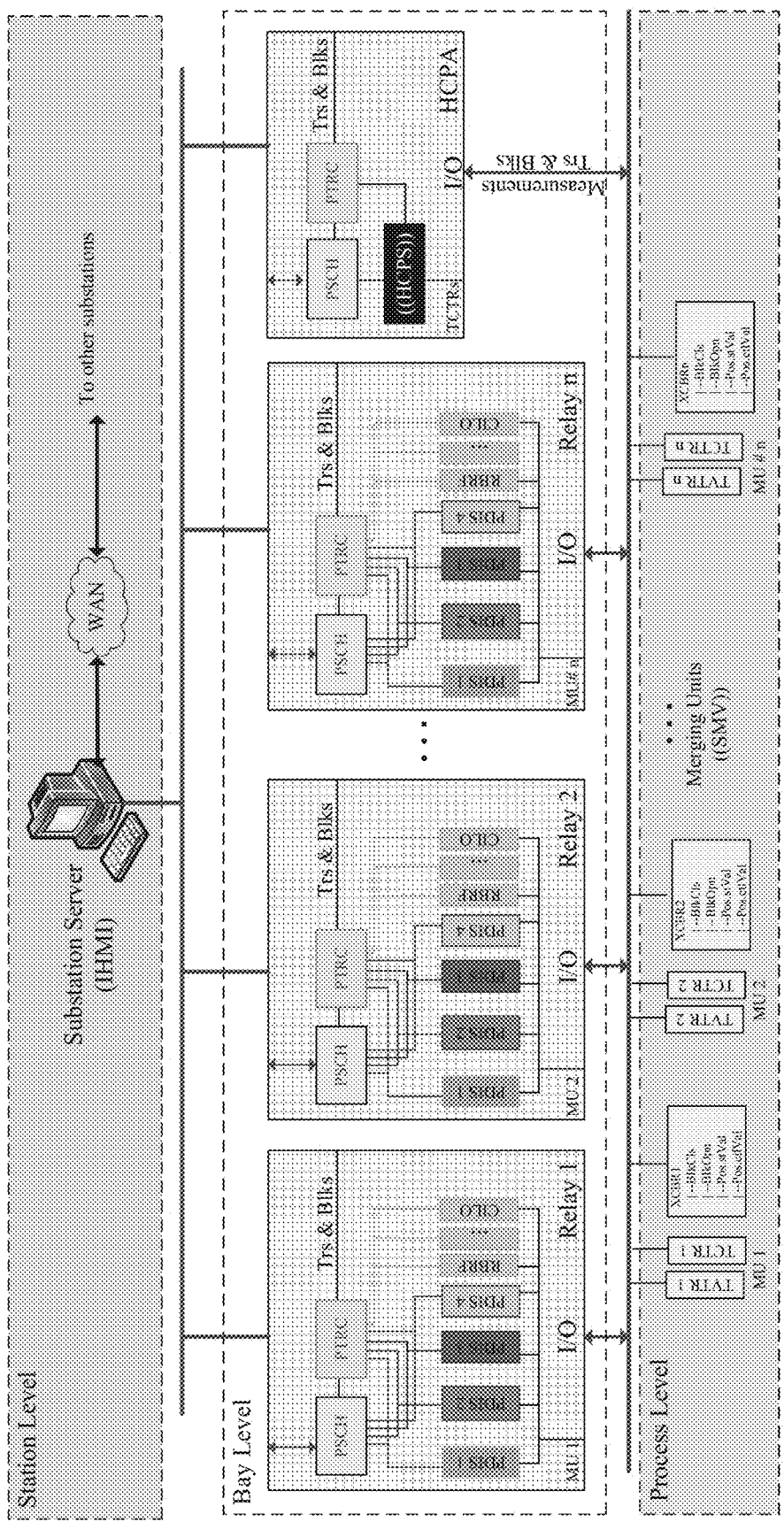
FIG. 2 shows the architecture of logical nodes and devices based on the IEC 61850 protocol for conventional relays and for a high current protection agent (HCPA) according to an embodiment of the subject invention.

FIG. 1 shows a schematic view of a protection system architecture according to an embodiment of the subject invention where the IEC 61850 is used for data exchange between protective relays within or between substations. FIG. 2 shows the logical nodes and devices within the substation for protective relays and a high current protection agent (HCPA) according to an embodiment of the subject invention. These devices can communicate through a LAN, and a fast network switch can be used to send/receive signals to/from other relays in this station. The exchanged data can be, for example, measurement data (e.g., SMV messages) from different measurement units in this substation or control command data (e.g., GOOSE messages), such as tripping, blocking, or reclosing signals. In addition to the LAN for communication within each substation, a WAN can also be deployed for inter-substation communication. Each substation can be equipped with a network router that can communicate with other networks to exchange data over the internet network. For this type of communication between relays in different substations, data should pass from layer 2 (data link) to layer 3 (network layer) and use the internet protocol (IP) to find their destinations in the network (e.g., through a routing service).

The GOOSE messages that can be sent/received through IP can be called routable GOOSE (R-GOOSE) messages. These messages can be used for sending tripping, blocking, or reclosing signals to relays at the other end of a transmission line in another substation. Because the GOOSE and SMV messages defined in IEC 61850 use real-time publish-subscribe protocol (RTPS) to send/receive data, an IED with proper subscribers connected to a network switch can receive all published data by all relays in the network and can also publish messages to different relays within its local substation or other relays in another substation. Such an IED can be referred to as an HCPA, which can add an intelligent protection scheme to an existing protection system to deal with very high fault currents higher than a BC of CBs in the power system.

Figure 3:
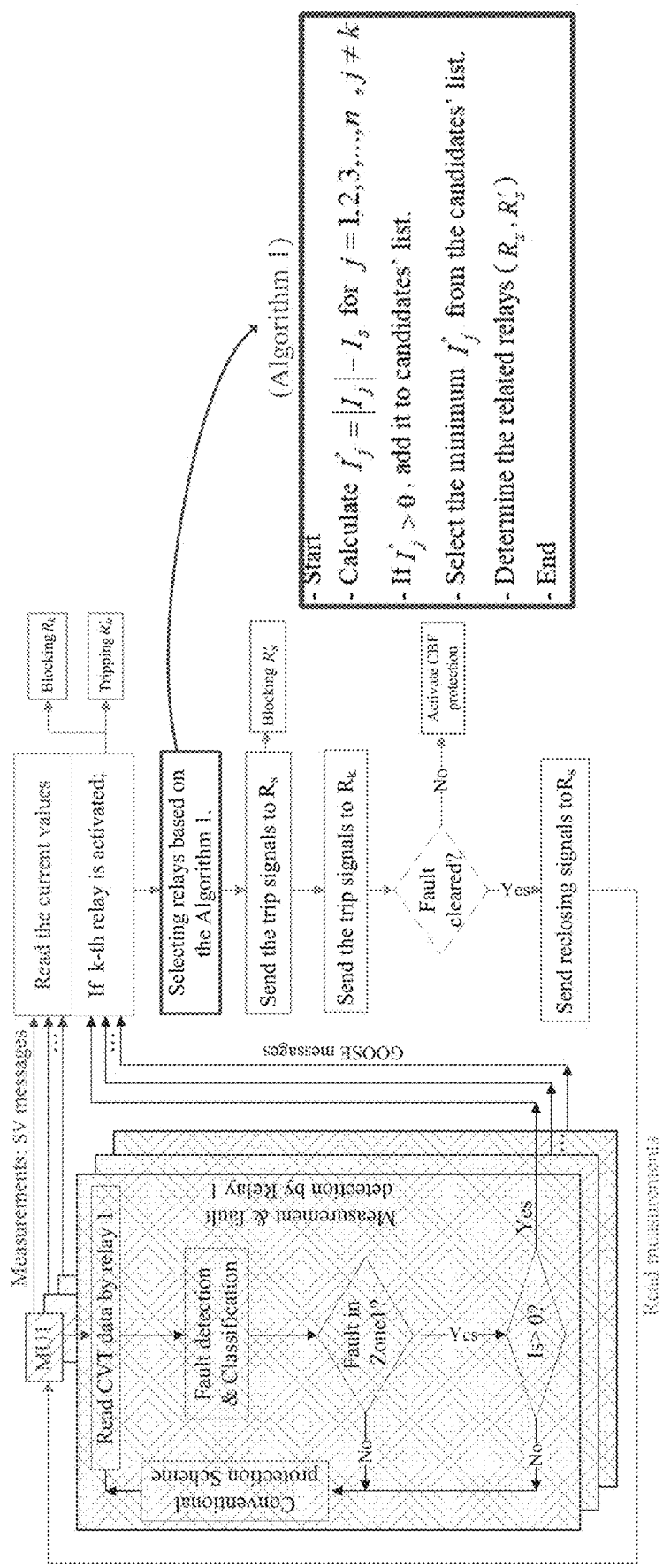
FIG. 3 shows a flow chart of a protection system or scheme according to an embodiment of the subject invention.

In embodiments, a high current protection scheme (HCPS) can be based on an intelligent decision from an HCPA that supervises the relay operation by different fault currents. Cascading tripping, blocking, and reclosing signals can be sent by the HCPA to one or more selected relays to protect and remove the fault from the system in an acceptable amount of time (e.g., the shortest possible time) by minimizing equipment outages. FIG. 3 shows a flowchart of an HCPS implemented by an HCPA in a substation where very high fault currents are probable, according to an embodiment of the subject invention. Table 1 shows an algorithm of a relay selection process by the HCPA.

TABLE I

Relay selection process by HCPA (Algorithm 1)

Start
Calculate $I_j'' = |I_j| - I_s$ for $j = 1,2,3, \ldots , n, j \neq k$
If $I_j'' > 0$, add it to candidates' list.
Select the minimum $I_j''$ from the candidates' list.
Determine the related relays ($R_s$, $R'_s$)
End In order to further clarify Algorithm 1, assume the HCPA is located at Bus 1 and an SHC occurred in the $k^{th}$ line in the system ($L_k$) very close to the $k^{th}$ relay ($R_k$) depicted in FIG. 1. Although the flowchart of FIG. 3 focuses on the measurements and decision-making for faults in $L_k$, the HCPA can be running parallel algorithms for all other lines connected to this substation. The process of the flowchart of FIG. 3 can start by getting data from the $k^{th}$ relay in this substation ($R_k$). It can read and analyze the measurements from a capacitive voltage transformer (CVT) to detect and classify the fault. If a relay senses a fault and the fault is in zone 1 of its distance protection, the HCPA can evaluate the magnitude of the fault current and compare it with the BC of the CB ($CB_k$) that is controlled by $R_k$. If the fault current ($I_f$) is above the maximum breaking current ($I_k^m$) of $CB_k$, the surplus current ($I_s$) is calculated by Equation (1), and if $I_s$ has a positive value the HCPS is activated, and otherwise the convention distance protection scheme can be used.

$$I_s = |I_f| - I_k^m \qquad (1)$$

For very high fault currents, $I_s > 0$, meaning that even if the distance protection sends a trip signal to $CB_k$, it can't open its contacts and break the fault current. In this situation backup protection would typically be activated, which would result in huge outages due to zone 2 operation of all relays feeding this fault. To avoid this interruption and clear the fault in the shortest possible time without installing any FCLs in the power system, the HCPA can be used to send cascading blocking, tripping, and reclosing signals to other relays in the power system to minimize service interruptions. The HCPA can be equipped by logical nodes defined by IEC 61850 to get the measurements from IEDs and send command signals to appropriate logical nodes of selected relays.

First, a blocking signal can be sent to $R_k$ because it can't stop the fault current and to avoid sending circuit breaker failure (CBF) to the busbar protection while a trip signal is published to $R_k'$ to quickly stop feeding the fault from the other end of the line. At the same time, the HCPA can evaluate fault currents measured by other relays in this substation and run Algorithm 1 to find the best relays for tripping. Referring to Algorithm 1, the surplus current ($I_s$) is compared with measured currents by current transformers (CTs) in this substation ($I_j$) and, if the comparison result ($I_j''$) is positive, the related relay (Rj) would be a candidate for tripping. Between these candidates, the one with the minimum value is selected and its related relay is called (Rs). $R_s'$ refers to the relay that is located at the other end of the transmission line where the Rs is located. This selection means that if this relay breaks its own fault current, the $I_s$ will be negative such that $CB_k$ can now break the fault current because it is less than its BC. To do this, the HCPA sends a tripping signal to Rs and at the same time sends a blocking signal to $R_s'$. Then, the tripping signal can be sent to the main relay close to fault (Rk) and after fault clearing a reclosing signal can be sent to pre-tripped relay (Rs) to return it back to the service.

Figure 4:
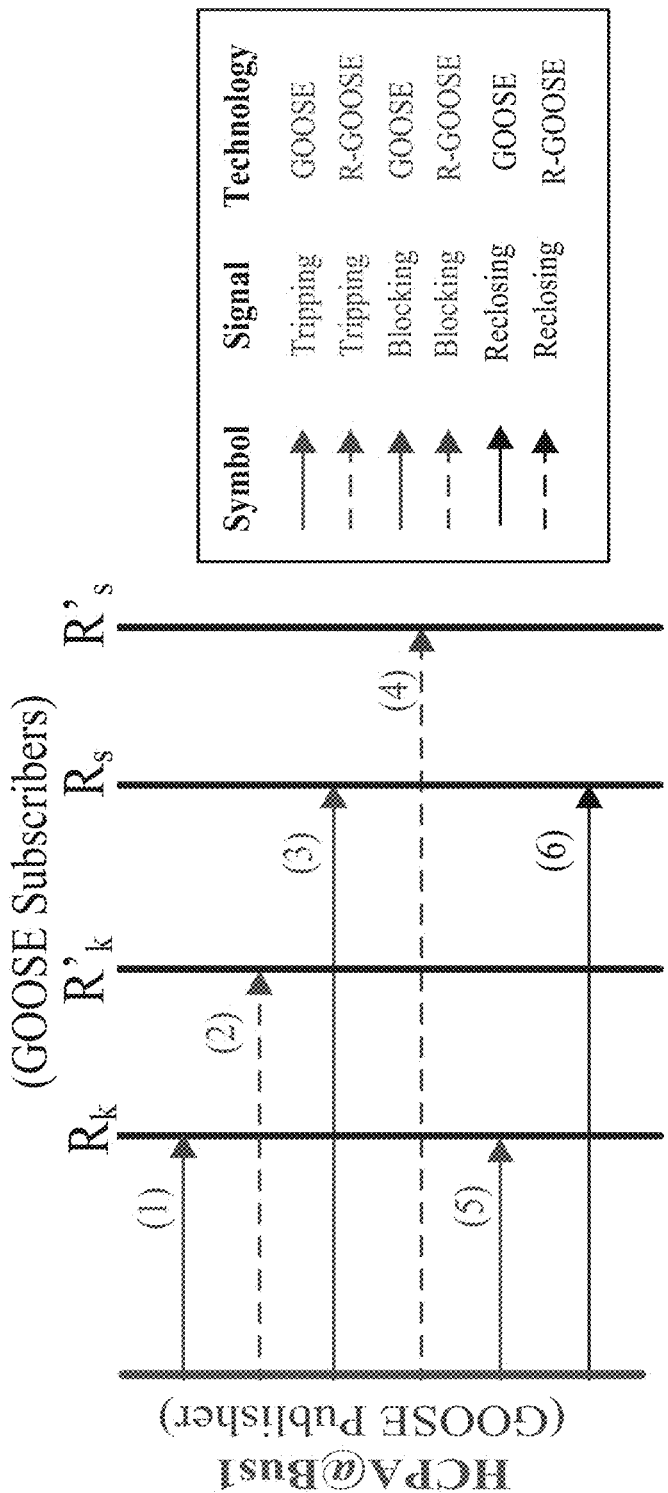
FIG. 4 shows generic object oriented substation event (GOOSE) message traffic created by an HCPA (e.g., an intelligent electronic device) at a bus (e.g., bus 1), according to an embodiment of the subject invention.

The GOOSE message traffic created by the HCPA at bus 1 is shown in FIG. 4. Referring to FIG. 4, the HCPA can be a GOOSE publisher, and different relays in the system may subscribe to published messages regarding the protection requirements. Further, it can be understood from FIG. 4 that the HCPA is running an additional protection scheme over the conventional distance protection to avoid large service interruption in the system.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

A simulation was run to demonstrate the advantages of HCPSs of embodiments of the subject invention in dealing with very high fault currents in a power system, in terms of minimum fault clearing time, minimum number of transmission line outages, and greater stability margin. Examples 1-4 will discuss four Cases (Cases 1-4), respectively. In each Example/Case, the simulation was run for a 400 kV power system with very high fault current due to some three phase to ground faults. Quasi-dynamic simulations were run to show the dynamic behavior of the power system in time domain for electromechanical and electromagnetic transient simulations. To model the SHC, the complete SHC method (i.e., superposition method) was used; this method is known as a highly accurate method for SHC calculations.

TABLE II

Time delay for each section of the protection systems

| Section | Delay |
| --- | --- |
| Fault detection | 2-10 ms |
| Fault classification | Up to 30 ms |
| Sending signals within substation (GOOSE) | Up to 4 ms |
| Sending signals Between substation (R-GOOSE) | Up to 10 ms |
| Breaker operating time | Up to 50 ms |
| Distance protection delay Zone 1 | 0 |
| Distance protection delay Zone 2 | 400-500 ms |
| Distance protection delay Zone 3 | 400-500 ms in addition to Z2 |

Figure 5:
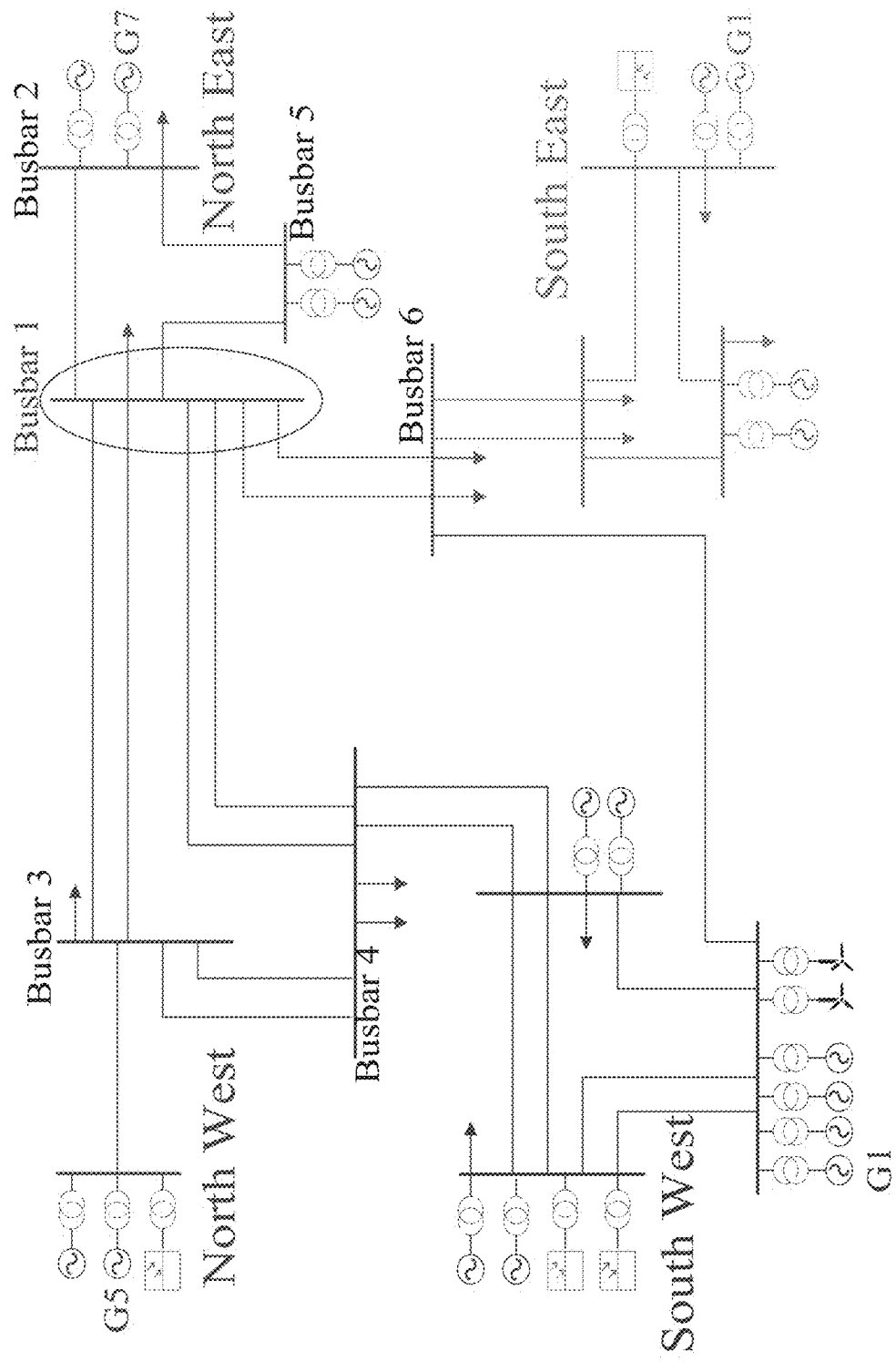
FIG. 5 shows a schematic view of a 400 kilovolt (kV) system.
Figure 6:
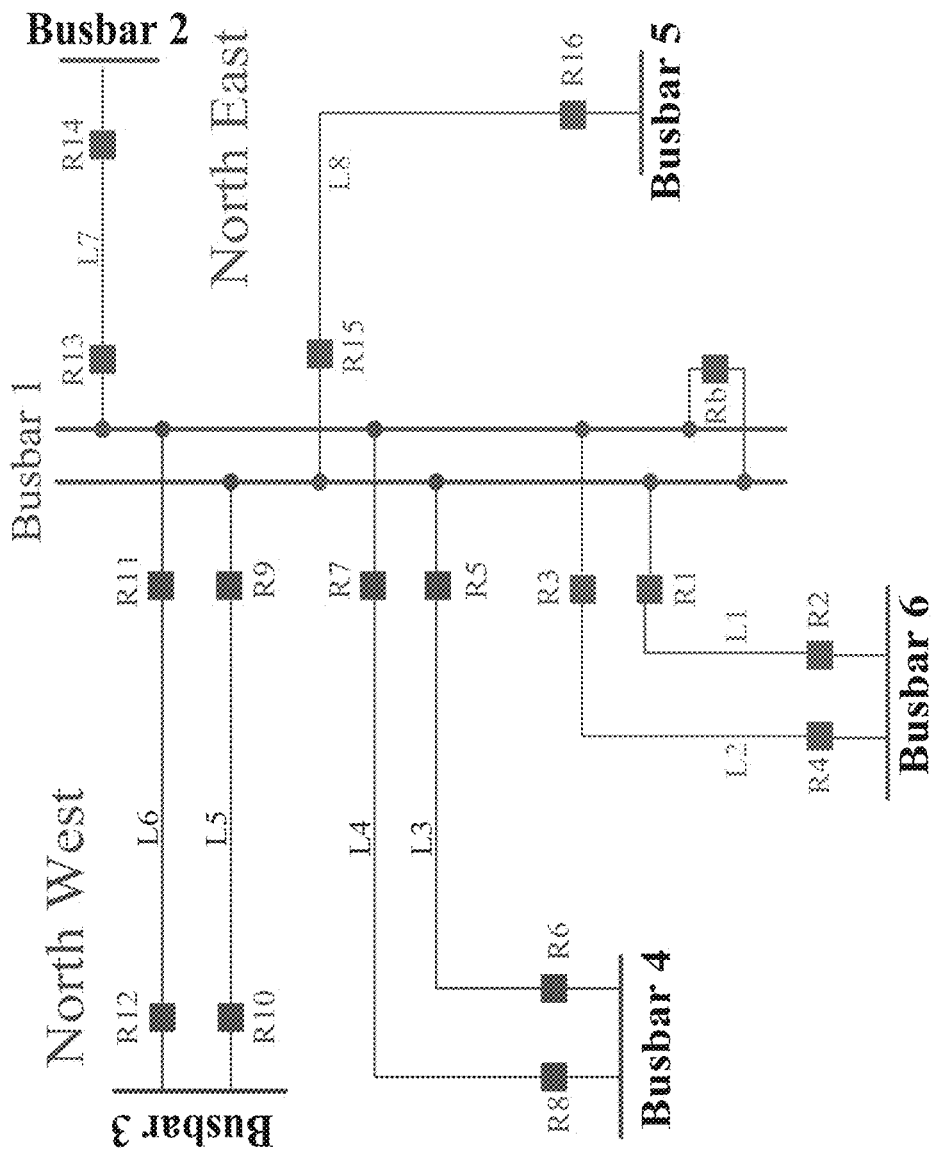
FIG. 6 shows a schematic view of busbar 1 in the system of FIG. 4.
Figure 7:
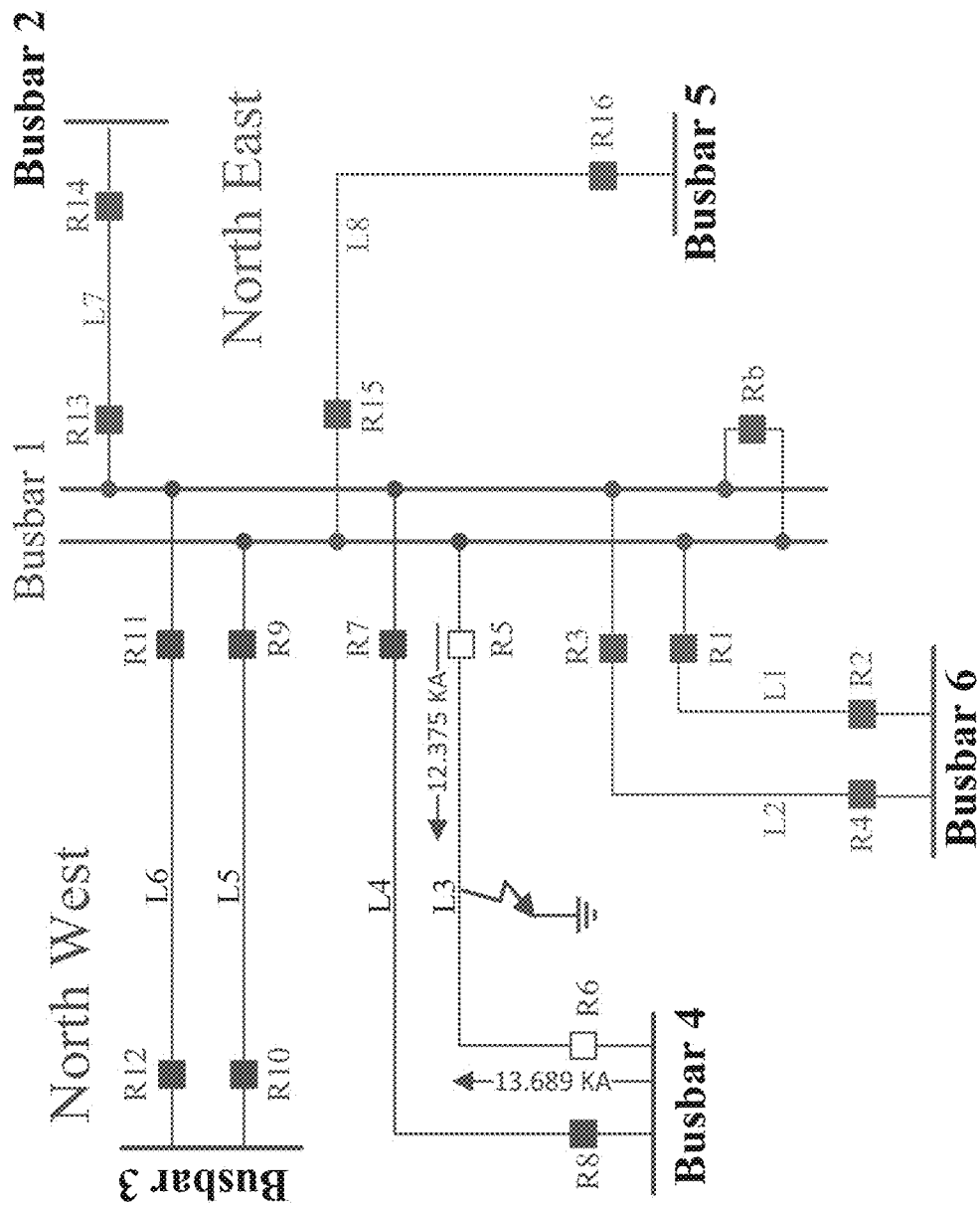
FIG. 7 shows a schematic view of system status of the busbar of FIG. 5, in a first case.
Figure 8:
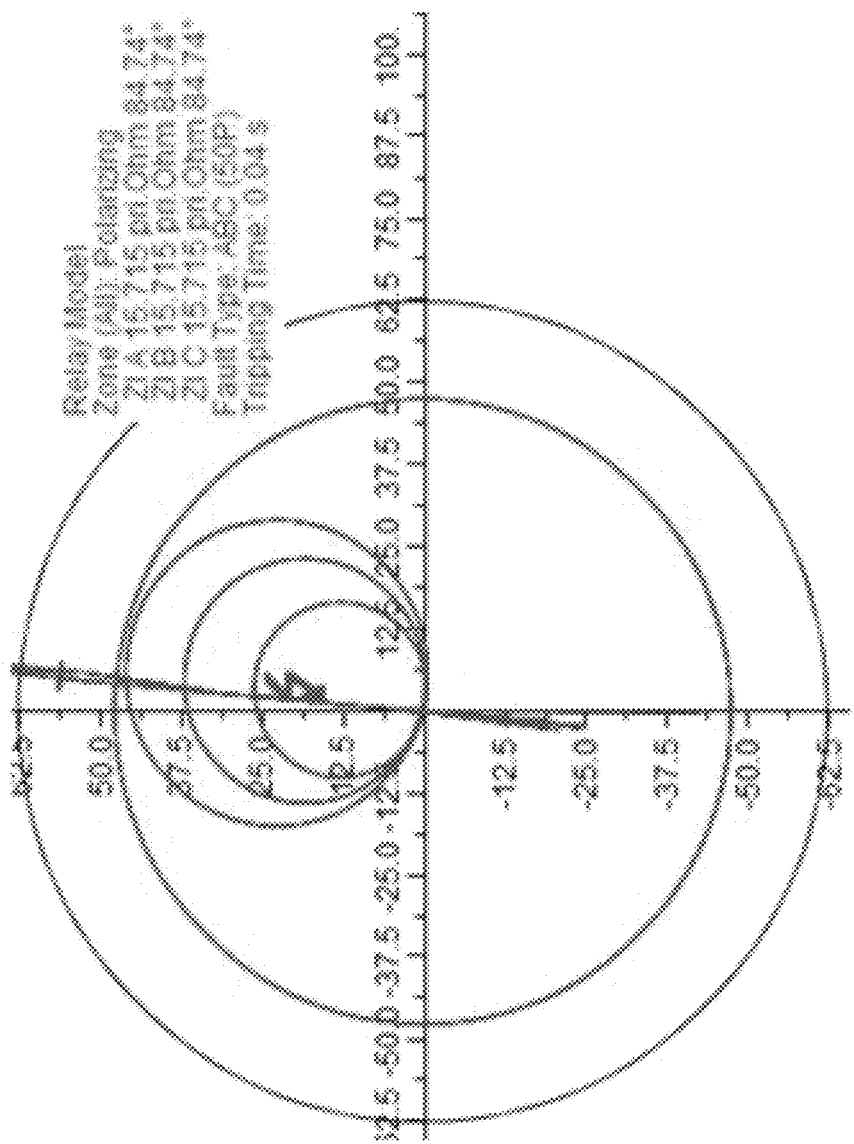
FIG. 8 shows a plot of distance characteristics of R5 from FIG. 6.

FIG. 5 shows the system under consideration in Case 1, which can be referred to as the base case. It is a 400 kV power system containing four areas (referred to as "north west", "north east", "south west", and "south east") and different types of generation such as conventional synchronous generators, solar panels, and wind turbines. To perform the HCPS in this system, a section of the system was concentrated on, such as Busbar 1 and all connected transmission lines to it. As shown in FIG. 6, Busbar 1 includes 6 busbars (referred to as Busbar 1 to Busbar 6), 8 transmission lines (referred to as L1 to L8), 16 protective relays (referred to as R1 to R16) for transmission lines, and one relay for busbar coupling (referred to as Rb). Case 1 shows the conventional distance protection results in dealing with a fault, when the SHC level is less than the BC of the CB(s). In this case, a three phase to ground fault was modeled at the middle (50%) of line 3 (L3) with zero fault impedance. The SHC currents in both sides of the line, for R6 and R5, were 13.669 kA and 12.375 kA, respectively. Both R5 and R6 see the fault in zone 1 and because the fault current is less than the BC of the CBs, the HCPA was not activated. It should be noted that the BC of the CBs for transmission lines was set to 63 kA. Therefore, instantaneous operation of zone 1 was expected for R5 and R6 and the fault was cleared in maximum 90 milliseconds (ms) (i.e., FCT=90 ms). This delay is because of required time for fault detection and classification (40 ms) and circuit breaker breaking time (50 ms) as mentioned in Table II. After tripping of R5 and R6, the fault was isolated from the rest of the system and only L3 will be out of service. FIG. 7 shows the system status in Case 1, and FIG. 8 shows distance characteristics of relay R5 in Case 1.

Example 2

Figure 9:
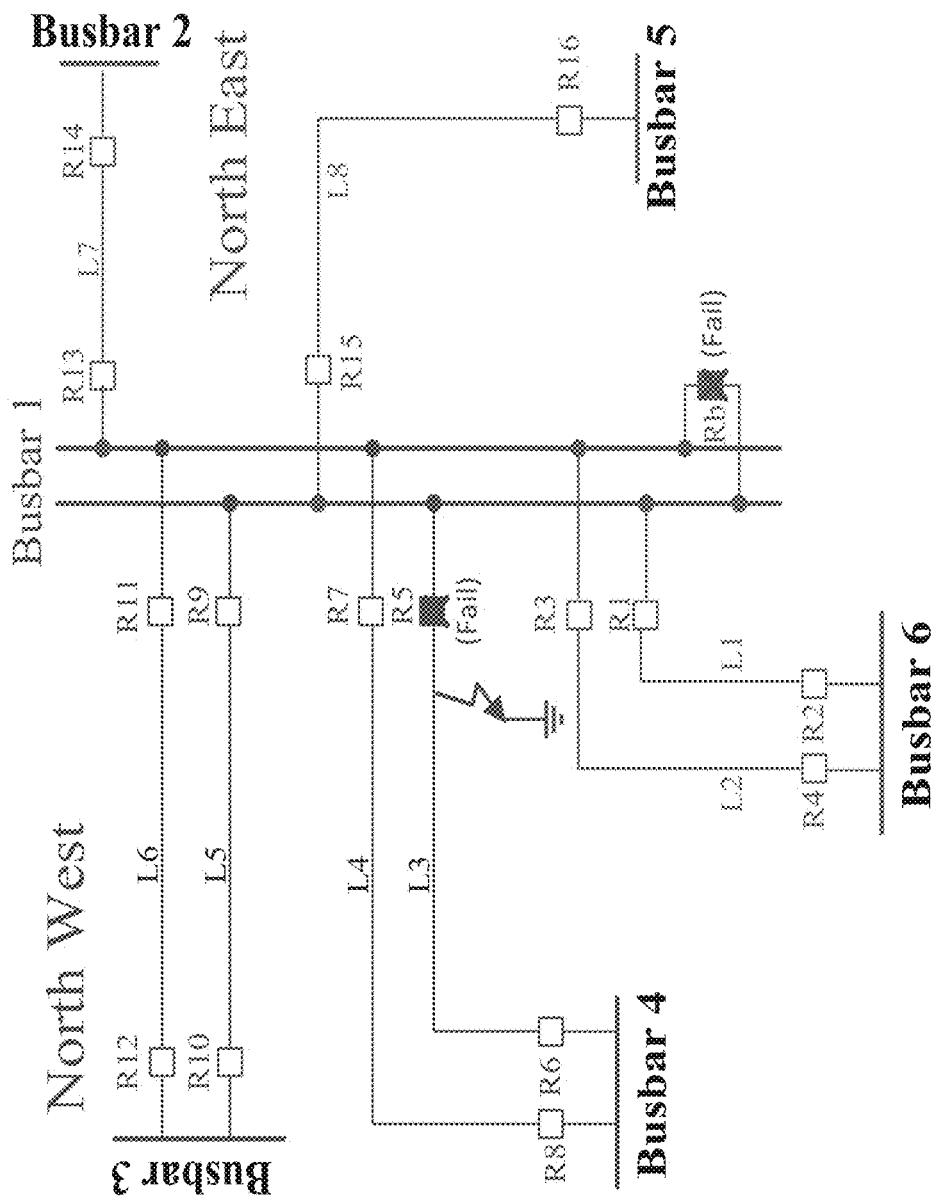
FIG. 9 shows a schematic view of system status of the busbar of FIG. 5, in a second case.

In Case 2, to simulate a very high fault current more than 63 kA, as shown in FIG. 9, a three phase to ground fault was modeled at the first 1% of L3's length close to Busbar 1, and the conventional distance protection scheme was evaluated in this situation. SHC calculations show that the fault current magnitude from Busbar 1 is 73.310 kA, which is more than the BC of the CB of this line (63 kA). Although R5 can detect the fault in zone 1 and send the trip signals to its own CB (CB5) and to R6 (relay at the other side of the L5), CB5 fails to break the fault current while CB6 is opened after receiving the trip signal. The continuation of the fault current will cause a cascading tripping of relays as follows. The over current protection of Rb (busbar coupling relay) sees 46.955 kA passing through its CB (40 kA BC is assumed for this CB), and as a result it also fails to break the fault current. In this situation, R2, R4, R10, R12, R14, and R16 see the fault in zone 2. To estimate tripping time (TT) for these relays, 40 ms should be considered for fault detection and classification, 400 ms should be considered for delay of zone 2, a maximum of 50 ms can be considered for breaking time of CB located at R16. It was assumed that other CBs operate before the maximum 50 ms for breaking the fault current.

Hence, the FCT for this fault using conventional distance protection scheme is equal to FCT in zone 2, which is 490 ms after the fault beginning. The summary of this protection is 15 switching actions, which result in an outage of 8 transmission lines (L1 to L8). This is a huge outage in this power system because the "north east" is then islanded from the rest of network and Busbar 1 is then out of service.

Example 3

Figure 10:
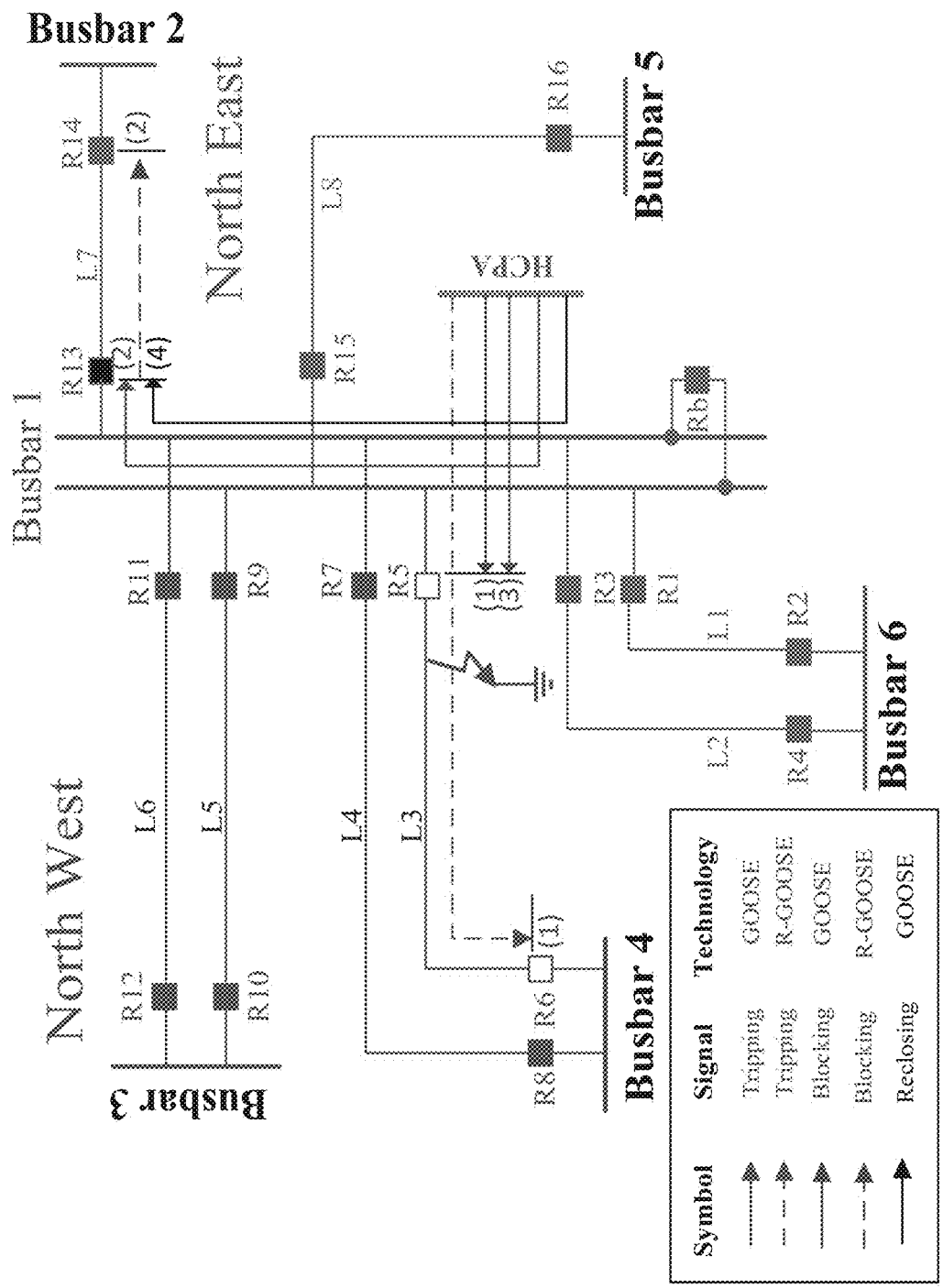
FIG. 10 shows a schematic view of the busbar of FIG. 5, showing the tripping order to high current protection, in a third case.

The fault and network condition in Case 3 is exactly as in Case 2 (Example 2), but the protection scheme here was equipped with an HCPS according to an embodiment of the subject invention to evaluate the effectiveness of the method. Using the HCPS, the fault was cleared just by four switching actions as shown in FIG. 10. Detailed description of these switching actions is as below.

1. By detecting the fault at zone 1 of R5 and activating the HCPA because of fault current magnitude, the tripping signal was sent to R6 immediately. The fault detection and classification (40 ms), R-GOOSE message delay (10 ms), and CB breaking time (50 ms), R6 operates after 100 ms of fault occurrence.

2. At the same time that the tripping signal is sent to R6, the HCPS decided to break the current coming from L7. Therefore, tripping and blocking signals were sent to R13 and R14, respectively. R13 opened its CB in maximum 94 ms after the fault began. Table III shows the SHC currents from all lines connected to this busbar, along with the selection process based on Algorithm 1 (see Table I).

3. When the SHC current coming from R13 was stopped, the HCPA sent a tripping command to R5 and the related CB opened its contacts in 54 ms (4 ms delay for GOOSE message and 50 ms for breaking time) after operation of R13.

4. By clearing the fault after 148 ms (FCT=148 ms), the HCPA sent a reclosing command to R13 to restore L7 to service. It takes a maximum of 4 ms for a GOOSE message to deliver to R13 and a maximum of 50 ms for reclosing. As a result, reclosing occurs in a maximum of 54 ms after fault clearance.

TABLE III

The results of Algorithm 1 for Case 3

| Line | $I_j$ (kA) | $I_s = I_f - I_k^m$ | $I_j''$ (KA) | Candidate list | $R_s$ & $R'_s$ |
|---|---|---|---|---|---|
| L1 | 7.839 | 73.655 − 63.00 = | −2.471 | L7 | R13 & R14 |
| L2 | 7.839 | 10.31 KA | −2.471 | | |
| L4 | 6.133 | | −4.177 | | |
| L5 | 9.152 | | −1.158 | | |
| L6 | 9.131 | | −1.179 | | |
| L7 | 23.9 | | +13.59 | | |
| L8 | 9.391 | | −0.919 | | |

Figure 11:
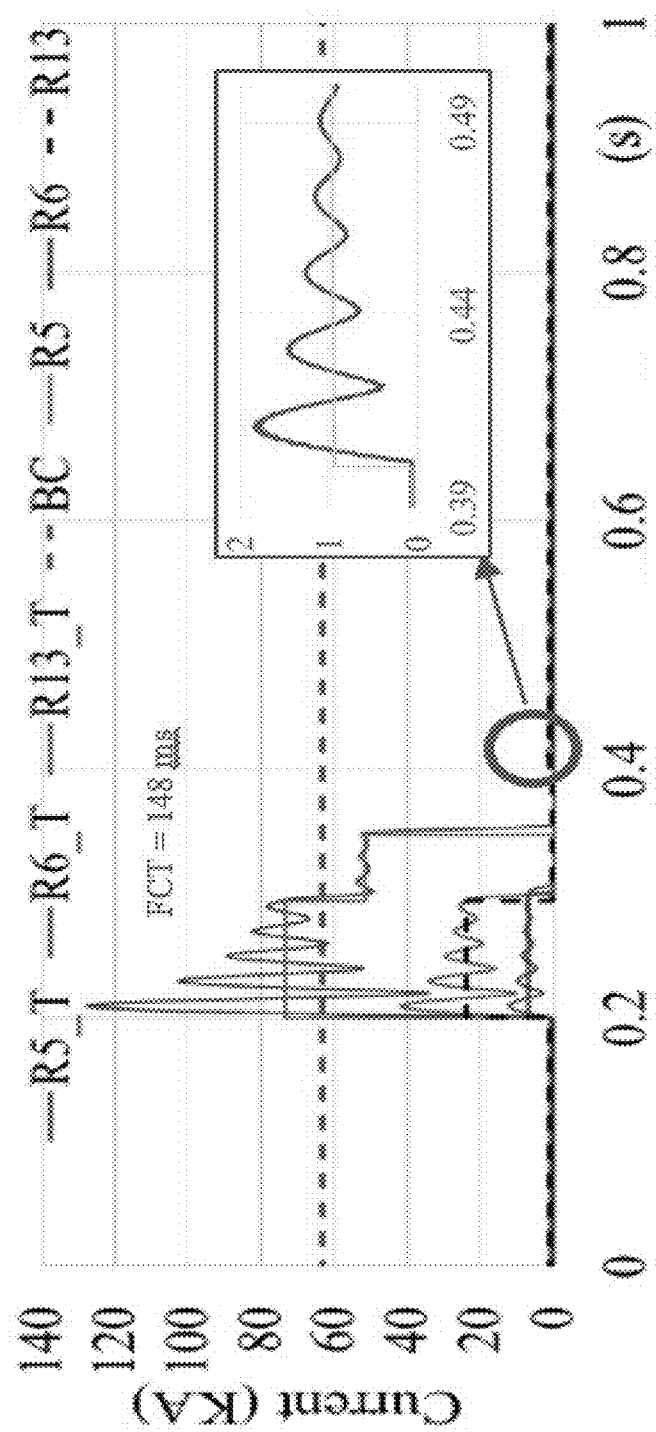
FIG. 11 shows a plot of current (in kiloamps (kA) versus time (in seconds (s)), showing quasi-dynamic simulation results for a third case.

FIG. 11 shows root mean squared (RMS) and transient values of currents for R5, R6, and R13. Referring to FIG. 11, R13 is reclosed at t=402 ms and carries its normal loading. The results demonstrate that the protection scheme is highly successful in removing the SHC current from the power system with a logical switching algorithm, which uses data exchange capabilities defined in IEC 61850. This protection scheme is comparable with an ideal protection scheme in dealing with very high fault current in a power system where there would otherwise be a need to limit the fault current by installing expensive equipment like FCLs, in terms of fault clearing time and power system stability margin. It should be noted that the HCPA isolated the faulty part of the power system without using any FCLs and, in fact, the HCPS only needed to use the capability of communication between protective relays using IEC 61850 standard.

Figure 12:
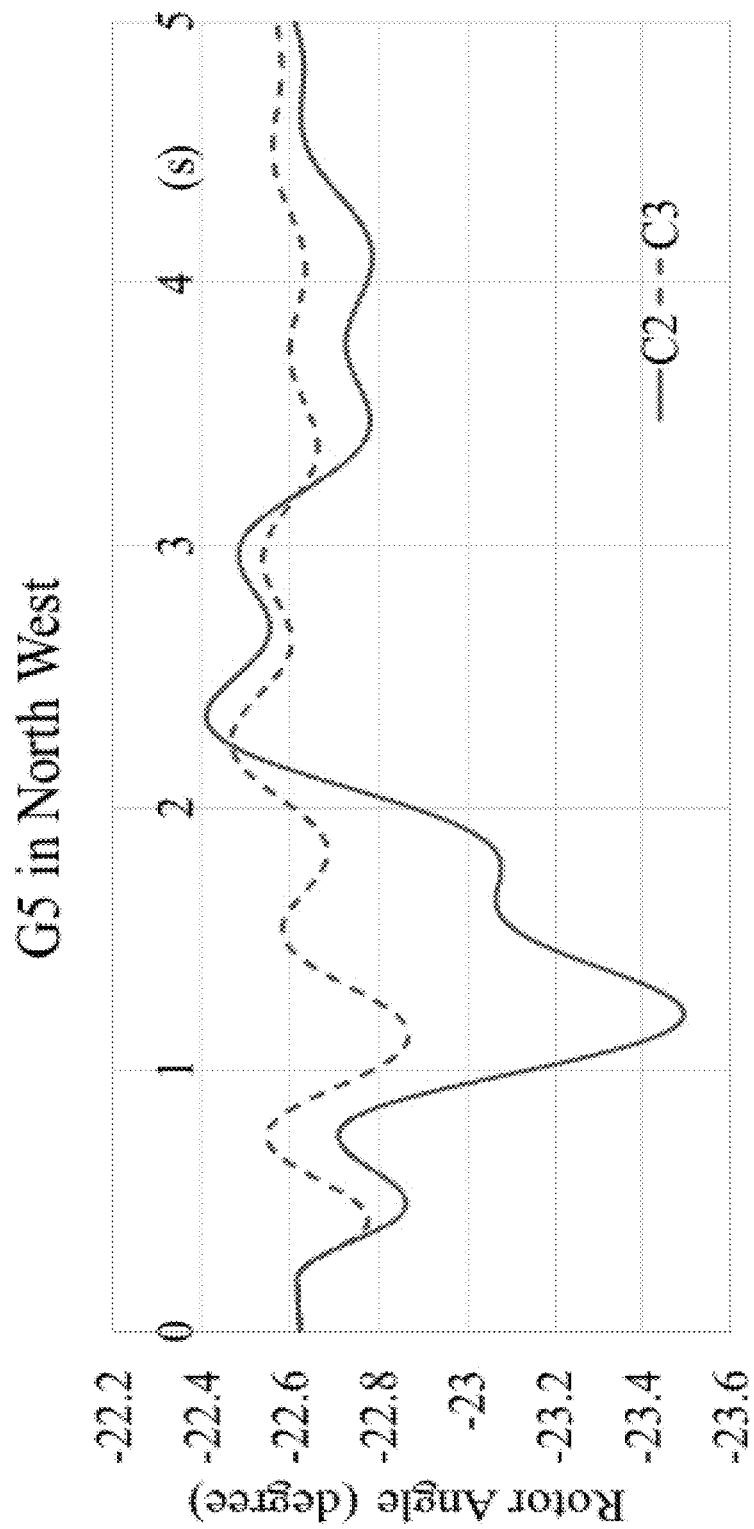
FIG. 12 shows a plot of rotor angle (in degrees) versus time (in s) for generator G5 in the "north west" section of the system of FIG. 4, for a second case (C2) and a third case (C3).
Figure 13:
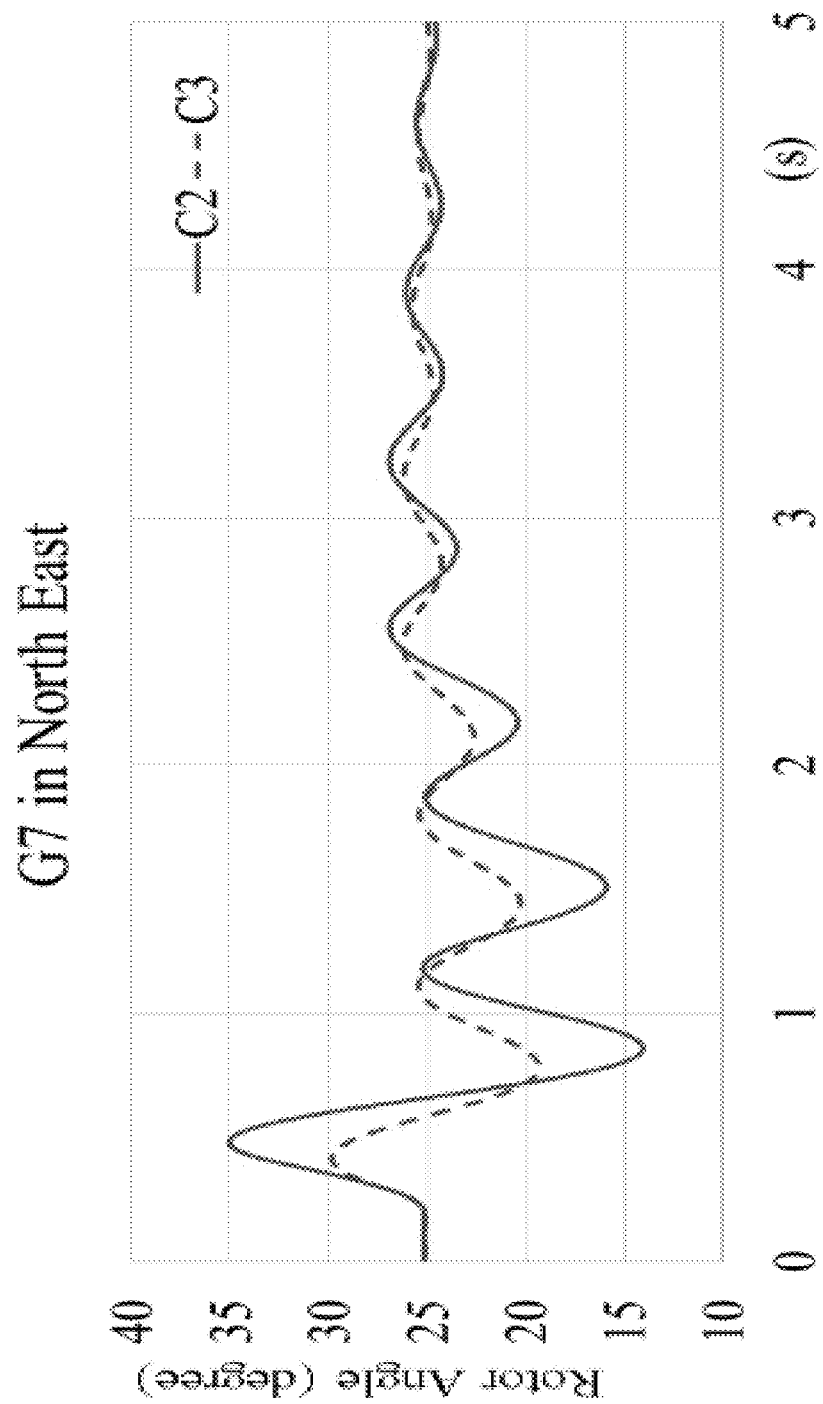
FIG. 13 shows a plot of rotor angle (in degrees) versus time (in s) for generator G7 in the "north east" section of the system of FIG. 4, for a second case (C2) and a third case (C3).
Figure 14:
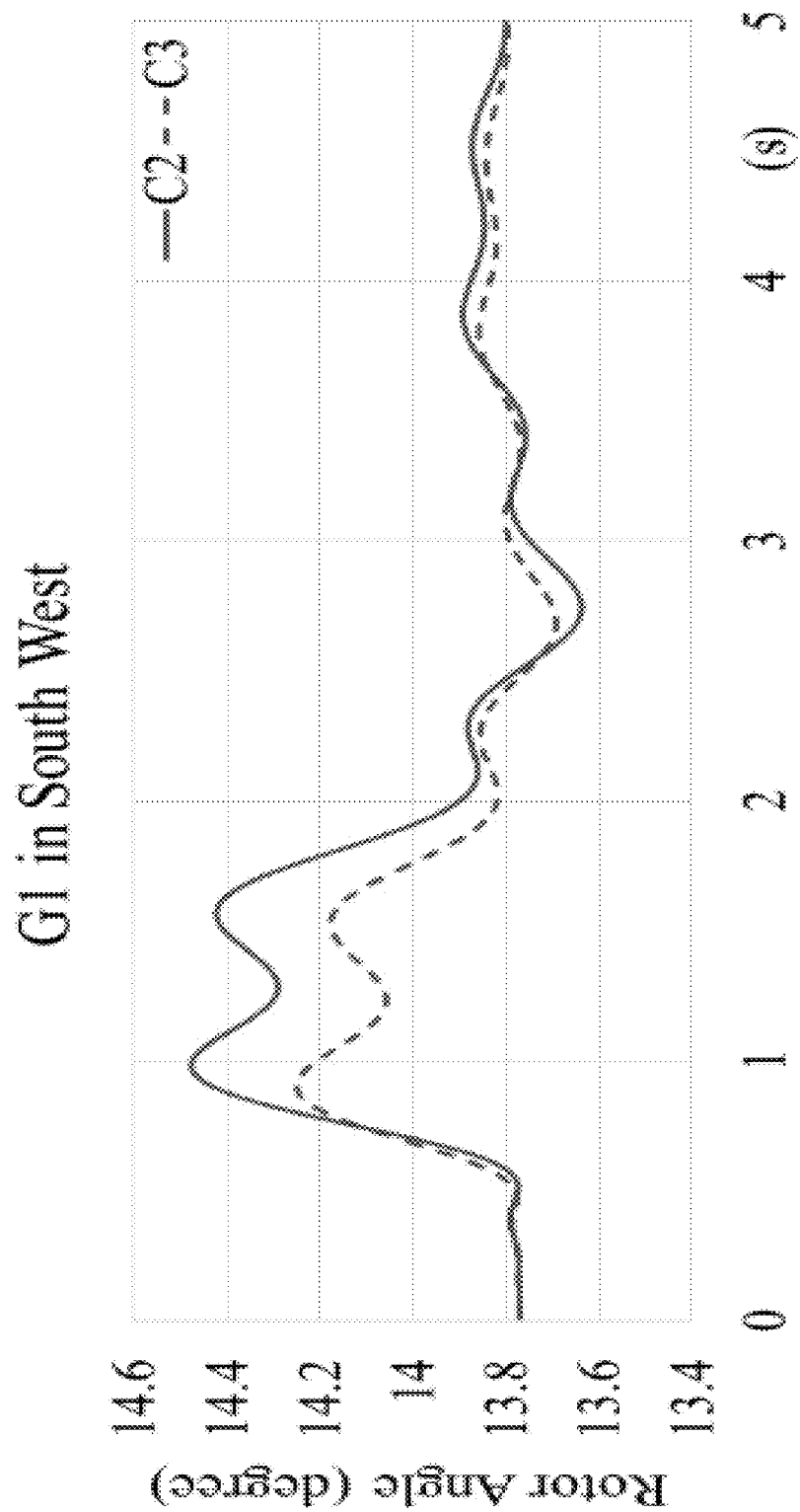
FIG. 14 shows a plot of rotor angle (in degrees) versus time (in s) for generator G1 in the "south west" section of the system of FIG. 4, for a second case (C2) and a third case (C3).
Figure 15:
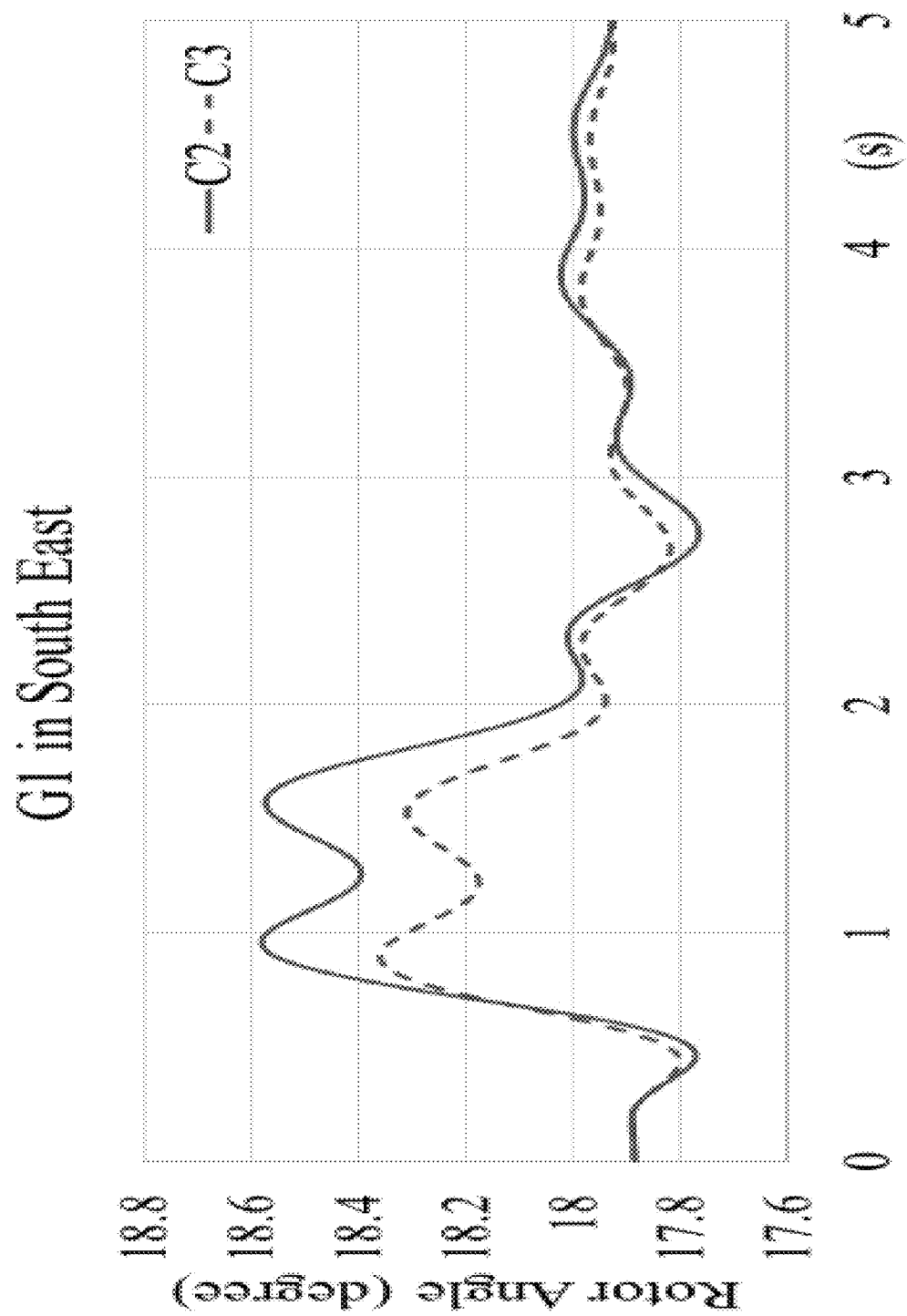
FIG. 15 shows a plot of rotor angle (in degrees) versus time (in s) for generator G1 in the "south east" section of the system of FIG. 4, for a second case (C2) and a third case (C3).

A lower FCT will result in less rotor angle acceleration during the fault and as a result less overshot and more stability margin. FIGS. 12-15 show the rotor angle of four generators located in four regions of the network for both Case 2 (C2) and Case 3 (C3). FIG. 12 is for generator G5 in the "north west" section; FIG. 13 is for generator G7 in the "north east" section; FIG. 14 is for generator G1 in the "south west" section; and FIG. 15 is for generator G1 in the "south east" section. Referring to FIGS. 12-15, deploying the HCPS significantly improved the stability margin of the power system in the presence of a very high fault current in the power system.

TABLE IV

The protection results for Cases 1-4

| Case | SHC in R5 (kA) | FCL installation | Protection scheme | Maximum FCT (ms) | Maximum rotor angle of G7 (°) | Number of Switching actions | Number of tripped lines |
|---|---|---|---|---|---|---|---|
| Case 1 | 12.375 | No | Conventional Distance | 90 | 27 | 2 | 1 |
| Case 2 | 73.655 | No | Conventional Distance | 490 | 35 | 8 | 8 |
| Case 3 | 73.655 | No | HCPS | 148 | 30 | 4 | 1 |

TABLE IV-continued

The protection results for Cases 1-4

| Case | SHC in R5 (kA) | FCL installation | Protection scheme | Maximum FCT (ms) | Maximum rotor angle of G7 (°) | Number of Switching actions | Number of tripped lines |
|---|---|---|---|---|---|---|---|
| Case 4 | 48.144 | Yes | Conventional Distance | 100 | 28 | 2 | 1 |

Example 4

Case 4 demonstrates the performance of the protection system equipped with FCLs. In Case 4, the fault was seen in zone 1 by R5 and tripping happened in a maximum of 90 ms while R6 was seeing the fault at zone 2. However, teleprotection was used by R5 to send the trip signal to R6. As mentioned before, the maximum latency for this signal is 10 ms, so R6 was operating in a maximum of 100 ms. In this case, like Case 1, the fault was cleared by two switching actions and just the faulty line was isolated from the rest of the system. However, installation of an expensive FCL, which requires frequent maintenance, was required to get such results.

Table IV summarizes the protection results for all of Cases 1-4 (Examples 1-4). Referring to Table IV, the best results are from Case 4 (system equipped with FCL) but the HCPS of embodiments of the subject invention (Case 3) also showed acceptable performance in dealing with a very high fault current. The FCT in C3 was a maximum of 148 ms, which is just 48 ms more than the FCT in C4 (100 ms), and much less than C2 where the conventional distance protection was operated by delay of zone 2. While C3 required twice as many switching actions as C4, the number of tripped lines as the same for both Cases 3 and 4. The HCPS of embodiments of the subject invention (Case 3) uses communication capabilities defined in IEC 61850 to establish switching priorities in such a way that the main CB can break the fault current (which is less than its BC) due to tripping other transmission lines, which are feeding the fault.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for protecting a power system against a current fault, a value of the current fault being higher than a breaking capacity of a circuit breaker in the power system, the method comprising:

analyzing, by an intelligent electronic device (IED) in operable communication with the power system, data of transmission lines of the power system;

identifying, by the IED, the current fault in a first transmission line of the transmission lines of the power system; and sending, by the IED, cascading tripping, blocking, and reclosing signals to relays of the power system to remove the current fault from the power system, the sending of the cascading tripping, blocking, and reclosing signals comprising using International Electrotechnical Commission (IEC) 61850 standard communication protocols, the sending of the cascading tripping, blocking, and reclosing signals further comprising:

sending, by the IED, a first blocking signal to a first relay associated with the circuit breaker on the first transmission line;

sending, by the IED, a first tripping signal to a second relay on the first transmission line;

determining, by the IED, a tripping order including determination of a third relay of the power system that is to be tripped;

sending, by the IED, a second tripping signal to the third relay;

sending, by the IED, a third tripping signal to the first relay; and determining, by the IED, if the current fault is removed from the power system and, if so, sending a reclosing signal to the third relay.

2. The method according to claim 1, the power system neither comprising nor being in operable communication with any fault current limiters (FCLs).

3. The method according to claim 1, the sending of the cascading tripping, blocking, and reclosing signals further comprising:

prior to determining if the current fault is removed from the power system, sending, by the TED, a second blocking signal to a fourth relay that is opposite the third relay on a second transmission line of the power system.

4. The method according to claim 1, further comprising:

after identifying of the current fault, calculating, by the IED, a surplus current ($I_s$) as follows:

$$I_s = |I_f| - I_k^m,$$

where $I_f$ is the value of the current fault and $I_k^m$ is the breaking capacity of the circuit breaker of the power system.

5. The method according to claim 4, the determining of the tripping order comprising performing the following steps:

i) calculate $I_j'' = |I_j| - I_s$ for j=1, 2, 3, . . . , n, j≠k;

ii) if $I_j'' > 0$, add it to a candidate list;

iii) select minimum $I_j''$ from the candidates' list; and iv) determine relays related to the minimum $I_j''$ as the third relay and the fourth relay, where $I_j$ is a measured current of the $j^{th}$ transmission line of the power system, n is a total number of substations of the power system, and k represents the first transmission line.

6. The method according to claim 1, the tripping, blocking, and reclosing signals being generic object oriented substation event (GOOSE) signals.

7. The method according to claim 1, the current fault being removed from the power system in 200 milliseconds or less.

8. The method according to claim 1, the power system being a smart power system.

9. A method for protecting a power system against a current fault, a value of the current fault being higher than a breaking capacity of a circuit breaker in the power system, the method comprising:
　analyzing, by an intelligent electronic device (IED) in operable communication with the power system, data of transmission lines of the power system;
　identifying, by the IED, the current fault in a first transmission line of the transmission lines of the power system;
　after identifying of the current fault, calculating, by the IED, a surplus current (Is) as follows:

$$I_s = |I_f| - I_k^m$$

where $I_f$ is the value of the current fault and $I_k^m$ is the breaking capacity of the circuit breaker of the power system; and
　sending, by the IED, cascading tripping, blocking, and reclosing signals to relays of the power system to remove the current fault from the power system,
　the sending of the cascading tripping, blocking, and reclosing signals comprising using International Electrotechnical Commission (IEC) 61850 standard communication protocols.

10. A framework for protecting a power system against a current fault, a value of the current fault being higher than a breaking capacity of a circuit breaker in the power system, the framework comprising:
　a network switch in operable communication with the power system; and
　an intelligent electronic device (IED) in operable communication with the network switch and the power system, the TED comprising a processor and a machine-readable medium having instructions stored thereon that, when executed by the processor, perform the following steps:
　　analyze data of transmission lines of the power system;
　　identify the current fault in a first transmission line of the transmission lines of the power system; and
　　send cascading tripping, blocking, and reclosing signals to relays of the power system to remove the current fault from the power system,
　the sending of the cascading tripping, blocking, and reclosing signals comprising using International Electrotechnical Commission (IEC) 61850 standard communication protocols, and
　the sending of the cascading tripping, blocking, and reclosing signals further comprising:
　　sending a first blocking signal to a first relay associated with the circuit breaker on the first transmission line;
　　sending a first tripping signal to a second relay on the first transmission line;
　　determining a tripping order including determination of a third relay of the power system that is to be tripped;
　　sending a second tripping signal to the third relay;
　　sending a third tripping signal to the first relay; and
　　determining if the current fault is removed from the power system and, if so, sending a reclosing signal to the third relay.

11. The framework according to claim 10, the power system neither comprising nor being in operable communication with any fault current limiters (FCLs).

12. The framework according to claim 10, the sending of the cascading tripping, blocking, and reclosing signals further comprising:
　prior to determining if the current fault is removed from the power system, sending a second blocking signal to a fourth relay that is opposite the third relay on a second transmission line of the power system.

13. The framework according to claim 10, the instructions when executed by the processor further performing the following step:
　after identifying of the current fault, calculate a surplus current (Is) as follows:

$$I_s = |I_f| - I_k^m,$$

where $I_f$ is the value of the current fault and $I_k^m$ is the breaking capacity of the circuit breaker of the power system.

14. The framework according to claim 13, the determining of the tripping order comprising performing the following steps:
　i) calculate $I_j'' = |I_j| - I_s$ for j=1, 2, 3, ..., n, j≠k;
　ii) if $I_j'' > 0$, add it to a candidate list;
　iii) select minimum $I_j''$ from the candidates' list; and
　iv) determine relays related to the minimum $I_j''$ as the third relay and the fourth relay,
　where $I_j$ is a measured current of the $j^{th}$ transmission line of the power system, n is a total number of substations of the power system, and k represents the first transmission line.

15. The framework according to claim 10, the tripping, blocking, and reclosing signals being generic object oriented substation event (GOOSE) signals, and
　the current fault being removed from the power system in 200 milliseconds or less.

16. The framework according to claim 10, the power system being a smart power system.

17. A framework for protecting a power system against a current fault, a value of the current fault being higher than a breaking capacity of a circuit breaker in the power system, the framework comprising:
　a network switch in operable communication with the power system; and
　an intelligent electronic device (IED) in operable communication with the network switch and the power system, the IED comprising a processor and a machine-readable medium having instructions stored thereon that, when executed by the processor, perform the following steps:
　　analyze data of transmission lines of the power system;
　　identify the current fault in a first transmission line of the transmission lines of the power system;
　　after identifying of the current fault, calculate, by the TED, a surplus current (Is) as follows:

$$I_s = |I_f| - I_k^m$$

where $I_f$ is the value of the current fault and $I_k^m$ is the breaking capacity of the circuit breaker of the power system; and
　　send cascading tripping, blocking, and reclosing signals to relays of the power system to remove the current fault from the power system,
　the sending of the cascading tripping, blocking, and reclosing signals comprising using International Electrotechnical Commission (IEC) 61850 standard communication protocols.

18. A method for protecting a power system against a current fault, a value of the current fault being higher than a breaking capacity of a circuit breaker in the power system, the method comprising:
- analyzing, by an intelligent electronic device (IED) in operable communication with the power system, data of transmission lines of the power system;
- identifying, by the IED, the current fault in a first transmission line of the transmission lines of the power system; and
- sending, by the IED, cascading tripping, blocking, and reclosing signals to relays of the power system to remove the current fault from the power system,
- the sending of the cascading tripping, blocking, and reclosing signals comprising using International Electrotechnical Commission (IEC) 61850 standard communication protocols,
- the power system neither comprising nor being in operable communication with any fault current limiters (FCLs),
- the sending of the cascading tripping, blocking, and reclosing signals comprising:
  - sending, by the IED, a first blocking signal to a first relay on the first transmission line;
  - sending, by the IED, a first tripping signal to a second relay on the first transmission line;
  - determining, by the IED, a tripping order including determination of a third relay of the power system that is to be tripped;
  - sending, by the IED, a second tripping signal to the third relay;
  - sending, by the IED, a third tripping signal to the first relay;
  - sending, by the IED, a second blocking signal to a fourth relay that is opposite the third relay on a second transmission line of the power system;
  - determining, by the IED, if the current fault is removed from the power system and, if so, sending a reclosing signal to the third relay, the method further comprising:
- after identifying of the current fault, calculating, by the IED, a surplus current ($I_s$) as follows:

$$I_s = |I_f| - I_k^m,$$

where $I_f$ is the value of the current fault and $I_k^m$ is the breaking capacity of the circuit breaker of the power system, the determining of the tripping order comprising performing the following steps:
  i) calculate $I_j'' = |I_j| - I_s$ for $j = 1, 2, 3, \ldots, n$, $j \neq k$;
  ii) if $I_j'' > 0$, add it to a candidate list;
  iii) select minimum $I_j''$ from the candidates' list; and
  iv) determine relays related to the minimum $I_j''$ as the third relay and the fourth relay, where $I_j$ is a measured current of the $j^{th}$ transmission line of the power system, n is a total number of substations of the power system, and k represents the first transmission line, the tripping, blocking, and reclosing signals being generic object oriented substation event (GOOSE) signals, the current fault being removed from the power system in 200 milliseconds or less, and the power system being a smart power system.

* * * * *